United States Patent
Sung

(10) Patent No.: US 9,392,291 B2
(45) Date of Patent: Jul. 12, 2016

(54) METHOD AND APPARATUS OF TEMPORARY IMAGE FRAME COMPRESSION

(71) Applicant: Chih-Ta Star Sung, HsinChu (TW)

(72) Inventor: Chih-Ta Star Sung, HsinChu (TW)

( * ) Notice: Subject to any disclaimer, the term of this patent is extended or adjusted under 35 U.S.C. 154(b) by 77 days.

(21) Appl. No.: 13/987,963

(22) Filed: Sep. 19, 2013

(65) Prior Publication Data

US 2015/0078431 A1    Mar. 19, 2015

Related U.S. Application Data

(63) Continuation of application No. 11/974,485, filed on Oct. 15, 2007, now Pat. No. 8,699,808.

(51) Int. Cl.
*H04N 19/17* (2014.01)
*H04N 19/172* (2014.01)
*H04N 19/149* (2014.01)
*H04N 19/124* (2014.01)

(52) U.S. Cl.
CPC .............. *H04N 19/17* (2014.11); *H04N 19/124* (2014.11); *H04N 19/149* (2014.11); *H04N 19/172* (2014.11)

(58) Field of Classification Search
None
See application file for complete search history.

(56) References Cited

U.S. PATENT DOCUMENTS

2008/0175475 A1* 7/2008 Sung .............................. 382/173
2009/0097764 A1* 4/2009 Sung .............................. 382/239

* cited by examiner

*Primary Examiner* — Kenny Lin

(57) ABSTRACT

An image compression method and fast storage device accessing and pixel decompression is achieved by applying variable bit rate to reduce the data amount of each image frame. Several thresholds are predetermined depending on the availability of the bandwidth of the storage device and the image resolution to decide the compression ratio of each image frame. Starting address of each compressed image frame is saved in predetermined location of the storage device for quick random accessing any compressed frame of image.

20 Claims, 5 Drawing Sheets

METHOD AND APPARATUS OF TEMPORARY IMAGE FRAME COMPRESSION

BACKGROUND OF THE INVENTION

1. Field of Invention

The present invention relates to method and apparatus for reducing data rate of image pixels, and particularly relates to compression and decompression of the temporary image frame with variable bit rate ranging from frame to frame.

2. Description of Related Art

The digital image and motion video have been adopted in an increasing number of applications, which include digital camera, scanner/printer/fax machine, video telephony, video-conferencing, video phone, VCD (Video CD), DVD, digital TV . . . etc. The success of development of the digital image and video compression standards including JPEG, a still image compression standard set by ITU and the MPEG, the motion video compression standard set by the ISO have played key role for the digital image and video applications.

Both JPEG and MPEG are lossy algorithms which when being decompressed, the image data are different from the original ones. And the bit rate of each image frame is variable depending on the complexity of the image pattern.

In the LCD TV, LCD monitor, LCD Driver, DVD, STB, Set-Top-Box, 3G mobile phone or other portable devices like scanner/printer, a decompressed video stream of continuously image will be temporarily saved into a storage device for other manipulation including scaling, de-interlacing and frame rate conversion before being sent to a display device or saving to a storage device. In these kind of applications, a fixed bit rate of compressed temporary image frame has convenience of allocating fixed density of the storage device or/and allocating fixed bandwidth of accessing the storage device during a pre-scheduled time slot. Fixed bit rate of a compressed temporary image frame provides necessary performance of quick accessing pixels of any image frame in the storage device which results in the saving of cost and power consumption. Since these image frames temporarily saved in the storage device will be used as references in the further image frames, keeping good quality is required for ensuring the good image quality for next image.

The main disadvantage of applying fixed bit rate in compressing a temporary image frame is that it is difficult to guaranty the image quality for each of image frames since the image pattern complexity varies widely from frame to frame.

Therefore, it is beneficial to reduce the bit rate of an image frame with a predetermined fixed bit rate while still keeping good image quality for potential adjustment in compression ratio from frame to frame. This invention applies variable compression ratio and mechanism of inserting starting address of each compressed image frame for quick random accessing each frame and each line within each frame of image.

SUMMARY OF THE INVENTION

The present invention is related to a method and apparatus of the temporary image frame compression with fast memory accessing and reconstruction, which plays an important role in image data reduction for the image frame. The present invention significantly reduces required storage device density and I/O bandwidth of the image within the storage device.

The present invention of the temporary image frame compression applies variable bit rate from frame to frame to reduce the pixel data and still maintain good image quality.

According to an embodiment of this invention, the bit rate of an image frame is fixed and each line of pixels is compressed with variable bit rate.

According to an embodiment of this invention, the bit rate information of each frame is stored in a temporary buffer and sent to compression engine for the decision making of the compression ratio.

According to an embodiment of this invention, the address of starting pixel of each group/line is saved in a temporary buffer and sent to the memory and saved in a predetermined location with the memory for fast accessing and reconstructing any line of pixels.

According to an embodiment of the present invention, predetermined threshold values are applied to to determine the compression ratio of each image frame.

According to another embodiment of the present invention, the accumulated bit rates of previously saved image frames are used to determine the compression ratio of coming image frame.

According to another embodiment of the present invention, each threshold value determining the compression ratio is set according to bandwidth availability of the targeted storage device.

It is to be understood that both the foregoing general description and the following detailed description are by examples, and are intended to provide further explanation of the invention as claimed.

DESCRIPTION OF THE PREFERRED EMBODIMENTS

Some image and video playback devices require high density of the storage device for temporarily saving the decompressed image(s) generated from an image source like an MEPG/JPEG video decoder. Some storage devices so called "Frame Buffer" are used to temporarily save the image or video frames for periodically displaying the image to a display device. Some of the temporary storage devices (frame buffer) are used to save the image frame for quality enhancement manipulation including image scaling, de-interlacing. And frame rate conversion. Especially the later 2 functions, for achieving high quality, at least two previous image frames are temporarily saved for image compensation and motion estimation for reconstructing the current image frame in de-interlacing and creating new frame in frame rate conversion. Fast accessing pixels of any frame in off-chip memory or area within an image frame becomes very critical task which requires high I/O bandwidth between an image or video codec and the image frame storage devices.

This invention of the image frame compression of the image or video stream reduces the bit rate of the image frame by assigning variable bit rate of image from frame to frame with the capability of fast random accessing and decompressing pixels of any frame in an off-chip memory or region, for example, any line within a frame.

Figure 1:
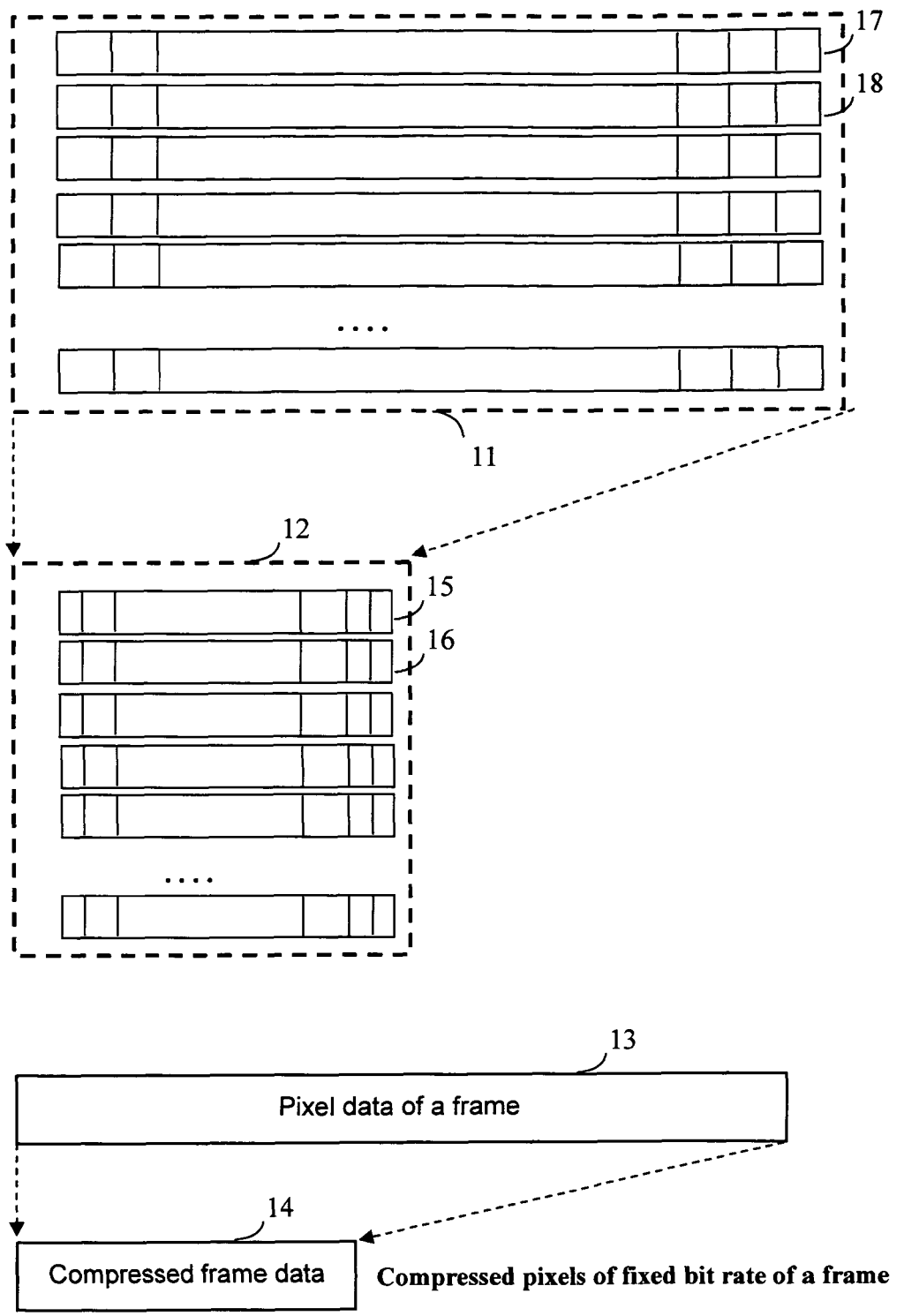
FIG. 1 illustrates a prior art of image frame compression with fixed bit rate of each frame.

FIG. 1 illustrates a prior art of image compression with fixed compression ratio of each image frame. A sequence of continuous image frames 11 is comprised of a certain numbers of image frames 17, 18. In this prior art image compression, each image frame 13 is compressed with fixed bit rate 14, for example, a 2.0× compression rate and comes out of a fixed length of bits of a sequence of compressed frames 15, 16. The advantage of this prior art image compression with fixed compression rate is that this scheme allows quickly accessing and decompressing any frame of pixels. The disadvantage of this prior art of image frame compression is lack of flexibility of allowing more bits for a frame with more complex pattern which might be difficult in compressing pixels to a predetermined bit rate.

Figure 2:
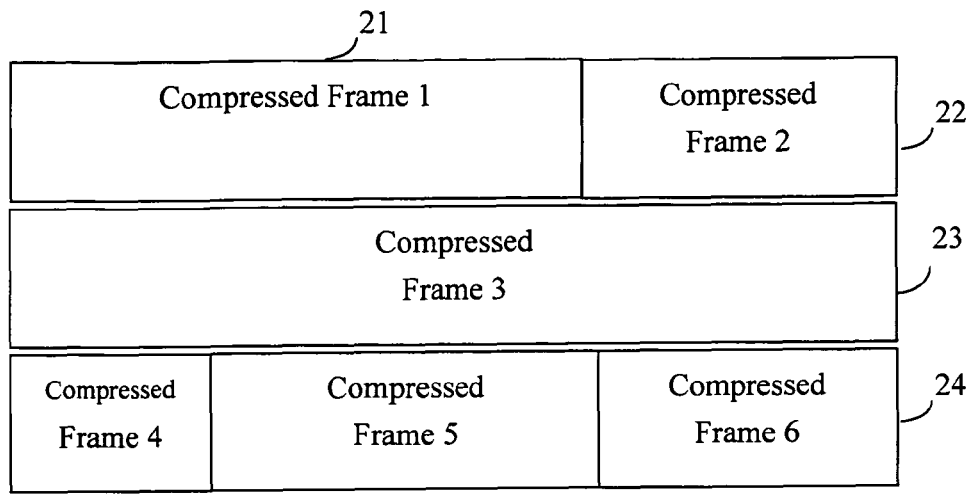
FIG. 2 illustrates the conceptual diagram of the image frame compression with variable bit rate of each frame.

FIG. 2 shows the conceptual method of this invention of compressed image frames. Those frames with simple patterns can be compressed with short bits as like frame 2 and frame 6, 22, 24, while frame 1 and frame 3, 21, 23 with high complexity will have higher bit rate result in larger frame size of storage device in saving compressed data. With this kind of variable bit rate from frame to frame, higher quality of image frames can be achieved. A memory chip can be used to save multiple compressed image frames.

Figure 3:
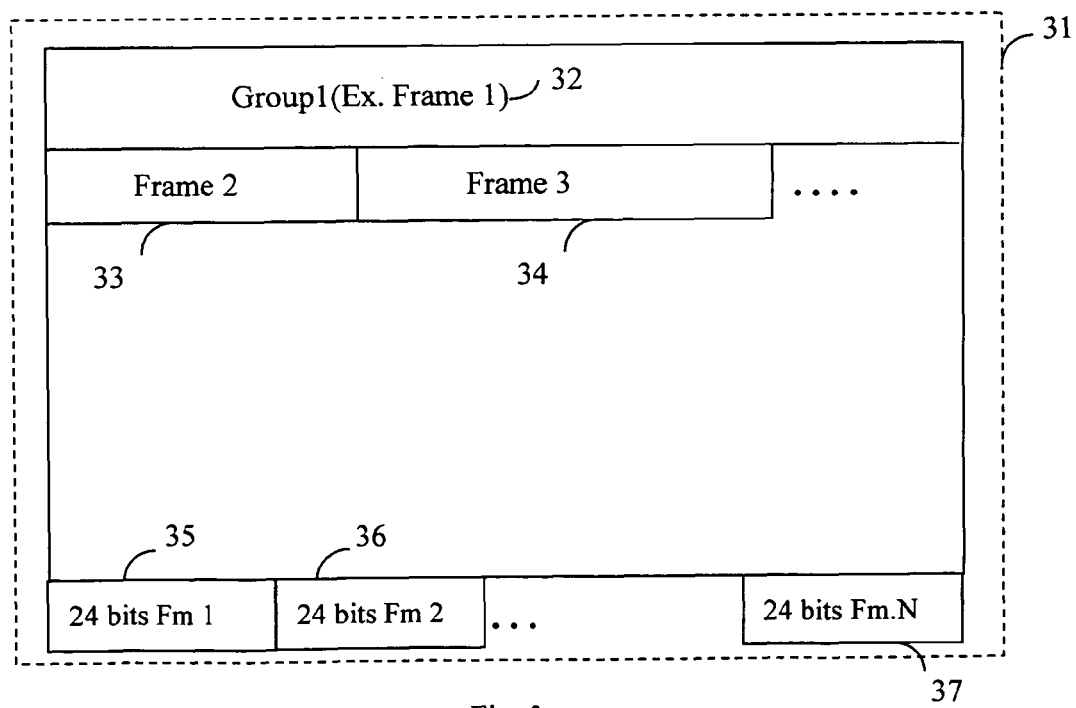
FIG. 3 illustrates the way of storing the compressed image data into the storage device with predetermined location storing the address of starting point of each frame image.

As shown in FIG. 3, multiple compressed image frames 32, 33, 34 are stored into a storage device 31, for example, a semiconductor memory chip. For quick random accessing any frame pixels, the predetermined locations 35, 36, 37 of the storage device is reserved to save the address of the starting location of each compressed image.

This invention deals with the compressed data and writing the compressed frame data as like a water dam with the gate controlling the amount of output, when water level is full, the gate is open wider to leak the water to avoid overflow, when the water level is lower, the gate is put lower to avoid underflow. Similar to the water dam, this invention has predetermined threshold values and checking the amount of accumulated bit number to decide the compression ratio or bit frame for the coming new image frame.

For example, the compression ratio of most image frames will be 2.0 times. If have high complexity for consequently image frames, the storage device might have high risk of overflowing or data congestion which slows down other operations due to the long time of accessing the pixels and a decision of compressing new coming image frame by higher compression ratio will be set. When low complexity for consequently image frames, or high compression ratio mechanism is turned on for consequent image frames, the storage device should have low risk of overflowing and the decision of lower compression ratio or lossless compression will be set.

Figure 4:
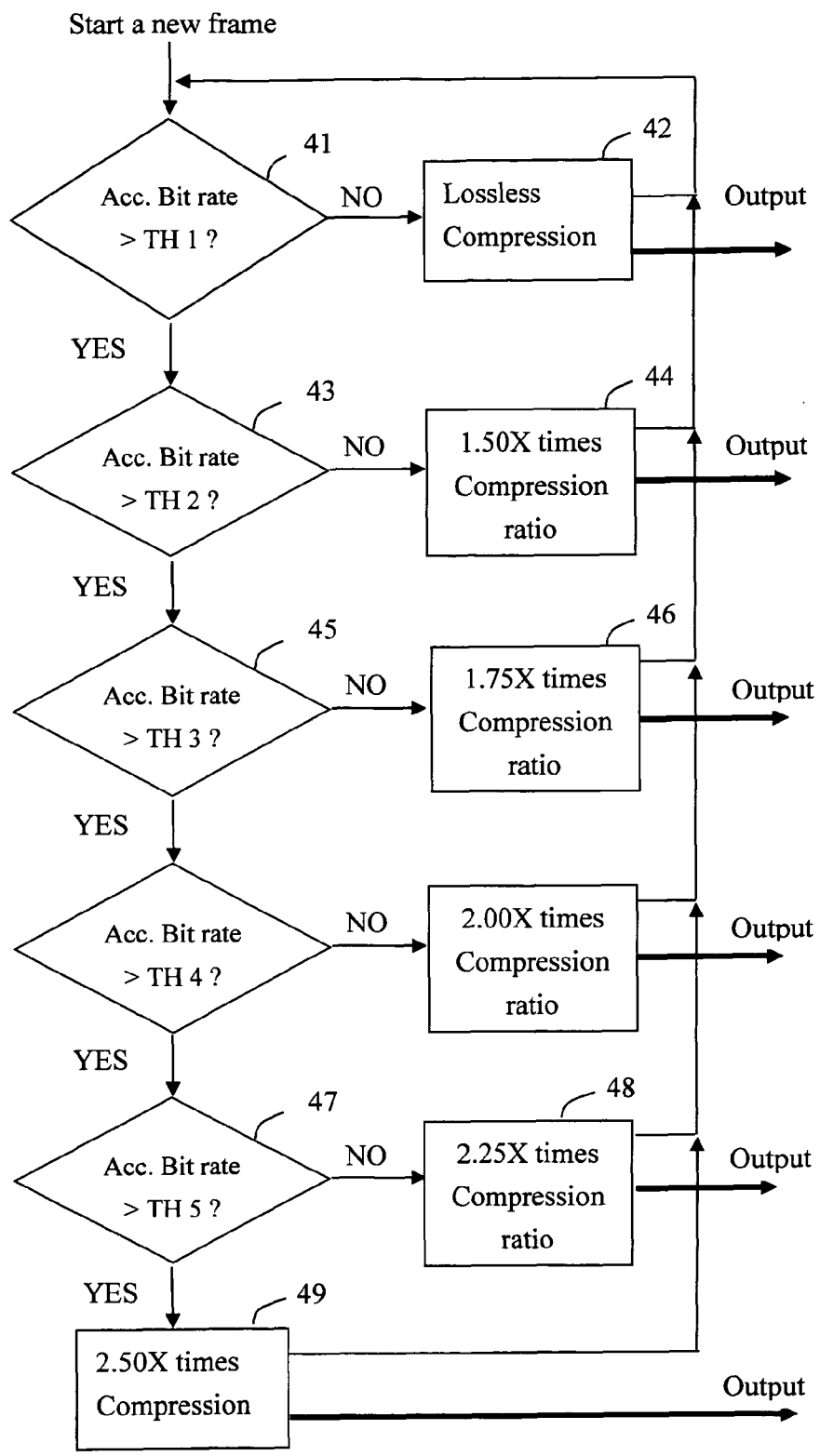
FIG. 4 shows the procedure flowchart of this invention of compressing the temporary image frame with variable bit rate from frame to frame with threshold values deciding the compression ratio of each frame.

Based on the spirit of monitoring the risk overflow of the storage device in above paragraph, a summary of procedure of the bit rate or said compression ratio decision mechanism is settled as shown in FIG. 4. Each new input frame enters the compression engine will have the accumulated bit rate compared to TH1, the $1^{st}$ threshold value 41, to see whether it is greater than TH1, if NO, means, the accumulated bit rate is very well under control and a "Lossless or said the $1^{st}$ compression" 42 algorithm will be applied torn compress the new coming image frame. If YES, then, the accumulated bit rate will be compared to TH2, the $2^{nd}$ threshold value 43 to see whether it is greater than TH2, "NO" means the accumulated bit rate is between TH1 and TH2, and the $2^{nd}$ compression ratio 44, for example. 1.50× times is enforced in compressing the new coming image frame. If YES, then, the accumulated bit rate will be compared to TH3, the $3^{rd}$ threshold value 45 to see whether it is greater than TH3, "NO" means the accumulated bit rate is between TH2 and TH3, and the $3^{rd}$ compression ratio 46, for example. 1.75× times is decided in compressing the new coming image frame . . . etc. The above procedure goes on till the far end of comparing the accumulated bit rate to, for example TH5, the $5^{th}$ threshold 47 to see whether it is greater than TH5. "NO" means the accumulated bit rate is between TH4 and TH5, and the $5^{th}$ compression ratio 48 is selected to compress the coming new image frame, if YES, then, a $6^{th}$ compression ratio 49, for example, 2.50× times is enforced to reduce the data rate for the coming image frame.

In many TV related applications, the above example can be realized as the following: In most cases, the image frames are compressed by using "Lossless compression" method, and when continuous image frames with high complexity patterns happened, the compression ratio might be adjust from 1.5× all the way to 2.0× times and stays in 2.0× times for some frames till variable complexity happened and the compression ratio is set according to the bandwidth availability.

The bit rate control and decision procedure illustrated in above paragraph can be applied to the compression of each group of pixels with a single frame of image.

Figure 5:
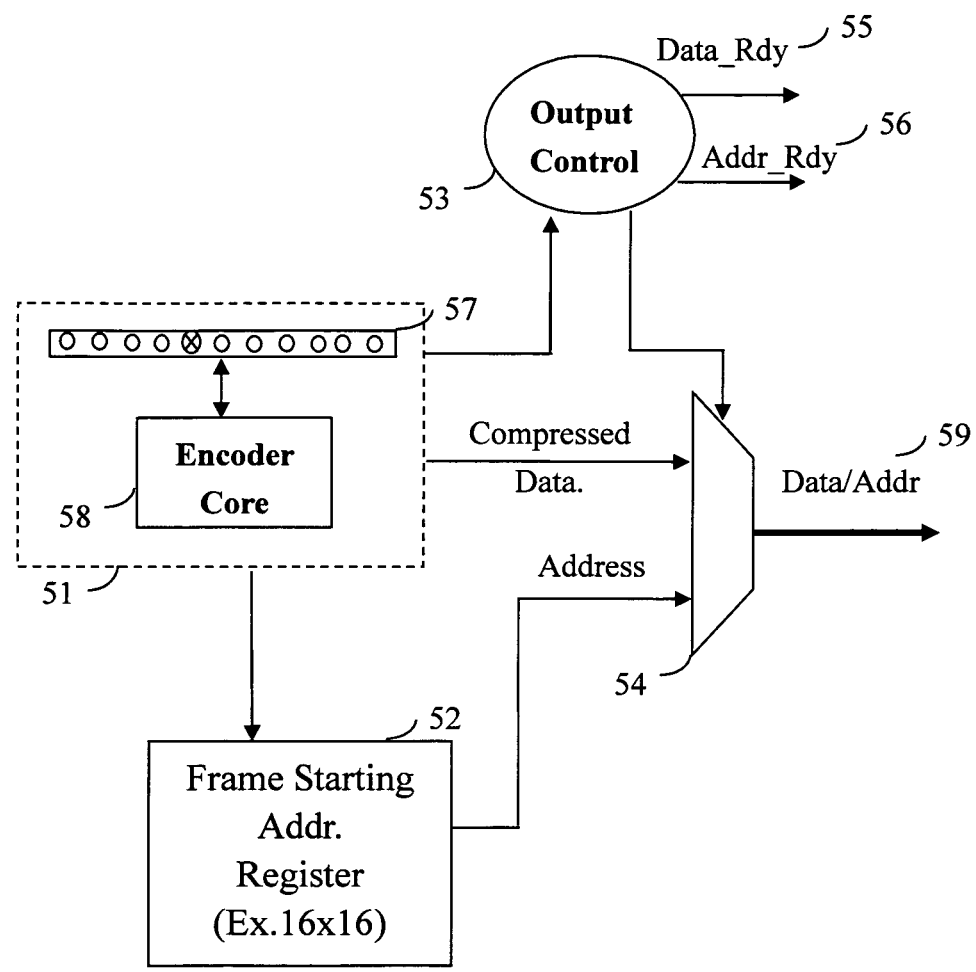
FIG. 5 depicts the block diagram of realizing this invention of compressing the temporary image frame with variable bit rate from frame to frame.

For storage device to be more easily arranged, the compressed pixel data and starting address of each group of compressed pixels, the compressed data and starting address are saved in predetermined different location. FIG. 5 depicts the implementing the hardware of compressing the image frame, a compression engine 51 with the compression core 58 and a register recording the calculated target of compression ratio 57 are combined with a register temporary saving the starting address 52 of a frame or group of pixels. The starting address and the compressed pixel data can share the same output bus 59 with a MUX 54 as an output selector or separately output to the targeted storage device. A control unit 53 generates the selection signal as well as sending out two enable or said RDY (Ready) signals 55, 56 to indicate the availability of compressed pixel data or starting address. With the valid data on the data/addr bus along with the "Data-Rdy" (data ready) or "Addr-Rdy" (Address ready) signals, the storage device will save the data or address in separate location without confusion.

Figure 6:
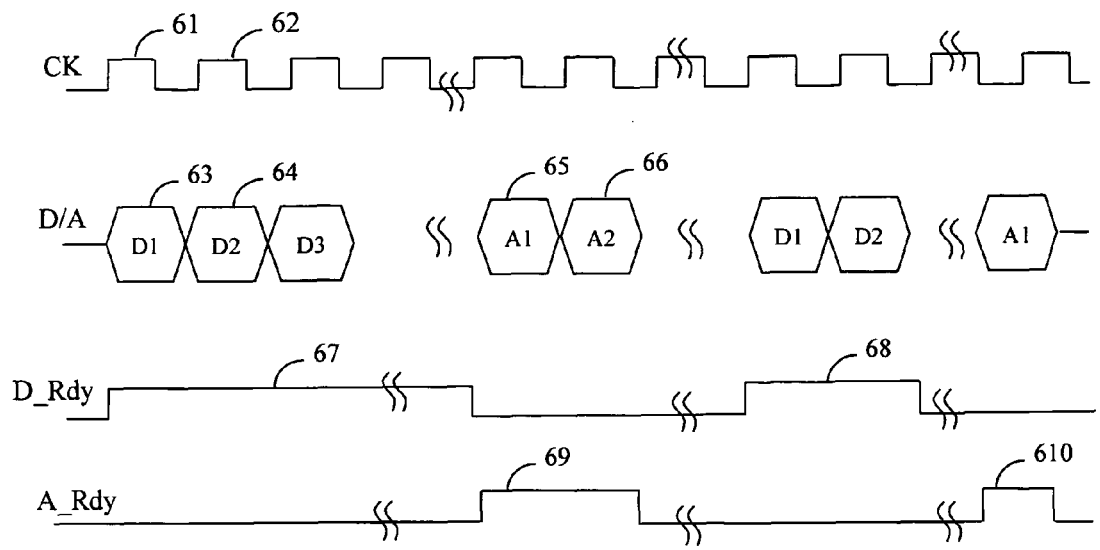
FIG. 6 illustrates how the signals and data/address bus which are interface to the memory.

FIG. 6 shows the timing diagram of the handshaking of the data/address and control signals of the compression engine. The valid data 63. 64 or address 65, 66 are output by most likely a burst mode with D-Rdy (data valid) 67, 68 and A-(Address valid) 69, 610 signals with active high enabling. All signals and data are synchronized with the clock 61, 62. With this kind of handshaking mechanism, the storage device will clearly understand the type and timing of the valid data and starting address of the groups of pixels. The temporary register saving the starting address can be overwritten after the stored address information is sent out and no longer needed. By scheduling outputting the starting address and overwriting the register by new starting address of a new group or frame of compressed pixels, hence, the density of the temporary register can be minimized.

Figure 7:
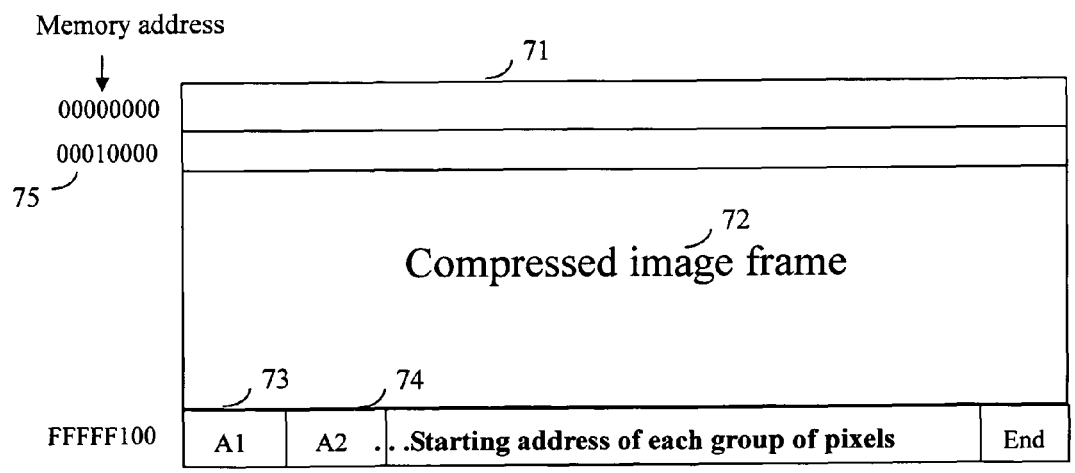
FIG. 7 illustrates how the compressed image data and corresponding starting location of each area (or line) is stored in the storage device.

FIG. 7 shows an example of how the storage device saves the compressed image data 71, 72 and starting address 73, 74 frame by frame or group by group. The storage device is most likely organized with predetermined code length of the mapping address 75. The starting address of a frame or a group or multiple groups of compressed pixels can be accessed first and be decoded to calculate the exact location of further group/frame of pixels and accessing the compressed pixel data accordingly. By adopting this mechanism of storing compressed data and starting address in a separate location within the targeted storage device, the time required to access, the time required to obtain the first pixel and further data of compressed pixels can be as less as 2 clock cycles and decompression procedure can be done in parallel manner making fast accessing any location and recovering any pixel feasible.

According to another embodiment of the present invention, each threshold value determining the compression ratio is settled according to bandwidth availability of the specific targeted storage device. An intelligent bit rate count is realized to monitor the accumulative bit rate of the compressed image frames to be the reference for deciding the compression ratio, or said bit rate for the current image frame.

Another embodiment of this invention is the variable compression ratios can be assigned to compress not necessary a frame, but a group of pixels within an image frame which breaks the frame boundary. And once the compression unit receives a signal of change of compression ratio before begin of each group of pixels, it switches the algorithm of compression method to compress pixels according to the compression ratio just settled.

It will be apparent to those skills in the art that various modifications and variations can be made to the structure of the present invention without departing from the scope or the spirit of the invention. In the view of the foregoing, it is intended that the present invention cover modifications and variations of this invention provided they fall within the scope of the following claims and their equivalents.

What is claim is:

1. A method of compressing an image frame and saving to a storage device, comprising: calculating the bit rate of each group of pixels and the accumulative bit rate of a predetermined amount of group pixels and saving the calculated values to the bit rate register; comparing the accumulative bit rate to the predetermined threshold values and deciding the compression ratio for the current group of pixels; compressing the current group of pixels by applying the corresponding compression algorithm which fits into the calculated compression ratio; and saving the compressed group of pixels and the corresponding starting address of each group of pixels into the targeted storage device.

2. The method of claim 1, wherein a register is used to record bit rate information of at least one group of pixels.

3. The method of claim 1, wherein at least two registers are implemented to temporarily save the starting address of at least two groups of compressed pixels and the information of these registers can be overwritten by new group data when they are saved into the targeted storage device.

4. The method of claim 1, wherein at least two compressed groups of pixels and the corresponding starting address are saved under separate time slots and saved into different locations of the storage device.

5. The method of claim 1, wherein during accessing any specific group of compressed pixels, the starting location saved in the predetermined location is accessed firstly, followed by accessing the compressed data.

6. The method of claim 1, wherein there are at least two thresholds are calculated and settled for predicting the compression ratio for each group of pixels.

7. The method of claim 1, wherein in deciding the targeted compression ratio, at least two compression ratios are predetermined including the lossless compression.

8. A method for transmitting an image frame to a storage device with fixed bandwidth, comprising: calculating the bit rate of each image frame; accumulating the bit rate of a predetermined amount of image frames; comparing the accumulative bit rate to the predetermined threshold values and decide the compression ratio for the targeted current image frame; compressing each targeted image frame of pixels by referring to the calculated compression ratio; and saving the compressed image data and the corresponding starting address of each image frame into the targeted storage device.

9. The method of claim 8, wherein the accumulative bit rate are transmitted and saved into a bit rate register.

10. The method of claim 8, wherein the decided compression ratio for the targeted current image frame are accumulated and send to the compression ratio when the accumulated bit rate meets the fixed bandwidth.

11. The method of claim 10, wherein the fixed bandwidth is set for compression ratio for different level.

12. An apparatus to compress an image frame, comprising: a calculator to calculate the bit rate of each group of pixels; a compression ratio definer to decide the compression ratio; a compression unit to compress the current group of pixels; and a storage device to save the compressed group of pixels.

13. The apparatus of claim 12, wherein the calculator to calculate the bit rate of each group of pixels along with a storage device to save the predetermined amount of group pixels.

14. The apparatus of claim 12, wherein the calculator along with a bit rate register to collect the calculated values.

15. The apparatus of claim 14, wherein the calculator along with a bit rate register is used to record bit rate information of at least one group of pixels.

16. The apparatus of claim 14, wherein the register can be overwritten while the previous information is saved into the storage device.

17. The apparatus of claim 12, wherein the compression ratio definer to compare the accumulative bit rate to the predetermined threshold values.

18. The apparatus of claim 12, wherein the storage device is ordered to have different locations for different compressed groups of pixels and the corresponding starting address.

19. The apparatus of claim 12, wherein the storage device is along with a buffer to save the compressed group of pixels and the corresponding starting address of each group of pixels in the storage device.

20. The apparatus of claim 19, wherein the buffer saved the predetermined location firstly, followed by accessing the compressed data.

* * * * *